2,887,499

HYDROXYLATED STEROID INTERMEDIATES AND METHODS FOR THEIR MANUFACTURE

Fernando Carvajal, Ridgewood, N.J., assignor to Schering Corporation, Bloomfield, N.J., a corporation of New Jersey No Drawing. Application November 13, 1958
Serial No. 773,575

11 Claims. (Cl. 260—397.45)

This invention relates to a new class of steroid compounds which are useful intermediates in the synthesis of physiologically active corticoids and to processes for their manufacture. More particularly, my invention is directed to 6β-hydroxy-1,4-pregnadienes which are easily convertible into known physiologically active hormone-like substances.

This application is a continuation-in-part of my copending application Serial No. 568,983, filed March 12, 1956, and now abandoned.

The compounds of my invention may be represented by the following general formula:

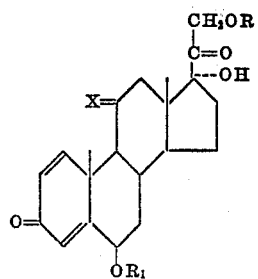

wherein X is a member of the group consisting of O and (H, OH); and each of R and $R_1$ is a member of the group consisting of H and acyl. The term "acyl" as employed herein is intended to encompass preferably those acyl radicals of organic acids containing up to 16 carbon atoms, and most desirably those containing from 1 to 10 carbon atoms. Thus included within this term are aliphatic (e.g., straight and branch chain alkyl), cycloaliphatic, heterocyclic and aromatic carboxy and sulfonyl substituents, such as for example, cyclohexane carboxylate, cyclopentyl propionate, nicotinate, furan-β-carboxylate, thiophene-α-carboxylate, acetate, propionate, butyrate, palmitate, methanesulfonate, isobutyrate, 2-methylheptanoate, benzoate, p-chlorophenoxyacetate, benzenesulfonate and p-toluenesulfonate radicals. The compounds of the general formula may be prepared from a wide variety of intermdiates. I prefer to employ the 6-desoxy-1,4-pregnadiene as starting material and introduce the oxygen function at C-6 in one step. The hydroxylation at C-6 may be effected by both chemical and microbiological methods which will be described below. Suitable starting materials are exemplified by substances such as 1,4-pregnadiene-17α,21-diol-3,11,20-trione, the corresponding 11β-hydroxy or 11α-hydroxy analog and 11-desoxy analog as well as their respective 21-esters. In addition, steroids such as 1,4-pregnadiene-17α-ol-3,20-dione and its 21-oxygenated analogs are suitable starting materials. The preparation of these starting pregnadienes is described both in literature and the copending application of Arthur Nobile, Serial No. 449,257 field August 11, 1954.

The following equation is illustrative of a chemical synthesis of a particular group of compounds falling within the general formula:

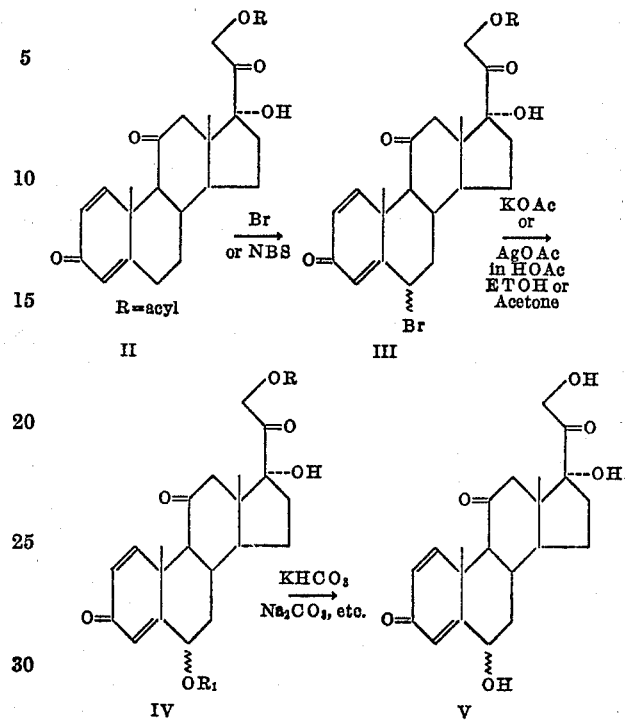

In the above sequence, a 21-ester of 1,4-pregnadiene-17α,21-diol-3,11,20-trione (prednisone), II is treated with a source of positive ion such as bromine or N-brom-succinimide whereupon a bromine atom is introduced at C-6 which is allylic to the 4,5 double bond whereupon the corresponding 6-brom-pregnadiene (III) is formed. Replacement of the bromo group by an acyloxy radical, $R_1$, such as acetoxy, is accomplished by reacting III with potassium acetate or silver acetate in a solvent such as acetic acid, ethanol or acetone. In this manner the 6β-acetoxy-pregnadiene (IV) is generated. In some instances, it may be preferred to have a non-esterified product and thus compound IV is easily saponified with potassium bicarbonate or sodium carbonate and the like, giving rise to 1,4-pregnadiene-6β,17α,21-triol-3,11,20-trione (V).

It is to be understood that the above description is given merely for the purpose of illustration and it is not intended that this particular reaction nor any other reactions described be limited solely to the particular steroid compounds set forth. For example, the foregoing sequence is equally applicable to the 11β-hydroxy, or 11-desoxy analogs of II, as well as their respective 21-desoxy analogs.

Although chemical methods are applicable for the preparation of my 6β-hydroxy-1,4-pregnadienes, I prefer to employ microbiological procedures. The introduction of a 6β-hydroxyl group into a steroid molecule is well described in the literature. Peterson et al., J. Amer. Chem. Soc. 75, 412, (1953), have isolated the 6β-hydroxy derivative of Reichstein's compound S from the fermentative reaction between Reichstein's compound S (4-pregnen-17α,21-diol-3,20-dione) and a microorganism of the species Rhizopus arrhizus. In an earlier work (J. Amer. Chem. Soc. 74, 5933, (1952), Peterson et al., showed that the reaction between the afore-mentioned organism with progesterone gave rise to a mixture of products comprising 11α-hydroxy-progesterone together with a small precentage of 6β,11α-dihydroxy-progesterone. The use of Aspergillis nidulans has been reported by Fried et al., Recent Progress Hormone Research, vol. 11, p. 149, (1955), to effect the introduction of a 6β-hydroxyl group into Reichstein's compound S and 16α-hydroxy-progesterone along with hydroxylations at other portions of the molecule. Furthermore, it has been reported that the fungus Gliocladium catenulatum in its action upon progesterone gives rise to a small amount of 6β-hydroxy-androstenedione. These foregoing references to the known methods of introducing a 6β-hydroxy group are only a portion of published data for the reaction. However, all the methods described for effecting a 6β-hydroxylation appear to suffer in that a mixture of products is obtained, or if a single product is obtained, it is generated in low yield. A mixture of products of similar polarity as is formed by hydroxylating steroids is inherently difficult to resolve and requires long and tedious extractions and operation technics in order to obtain pure substances.

I, however, have found a procedure whereby a 6β-hydroxyl group may be introduced into a steroid molecule in essentially quantitative yield. Specifically, I have found that a microorganism of the genus Chaetomium behaves uniquely in that only one position of the steroid nucleus is attacked, and transformation of the starting compound to the corresponding 6β-hydroxyl analog is substantially complete. As is general in microbiological transformations, certain species of a genus, for one reason or other, lend themselves better to a particular reaction. Of the genus Chaetomium I have found that the species C. funicolum (QM-33C), C. cochliodes, C. mollipilium, and C. succineum are about equal to each other in their activity and as a group are superior to certain other species of the genus Chaetomium. Thus by culturing and incubating one of the aforementioned species of Chaetomium and contacting the growing organism with the starting material, there is obtained after 24 to 72 hours, essentially a 100% transformation and the corresponding 6β-hydroxy product is easily isolated. Specifically, bringing 1,4-pregnadiene-11β,17α,21-triol-3,20-dione 21-acetate in contact with a species of Chaetomium such as C. funicolum (QM-33C) or the enzymatic extract thereof, according to analogous procedures described in the literature, there is obtained 1,4-pregnadiene-6β, 11β,17α,21-tetrol-3,20-dione. Similarly, utilizing any of the starting materials set forth heretofore, the 6β-hydroxylated product is obtained. The following equation broadly sets forth the process involved and it is understood that the species of Chaetomium indicated is shown merely by way of example and is not indicative of necessary limitation.

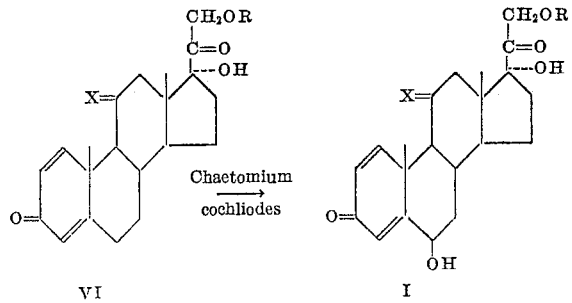

wherein X is a member of the group consisting of O, and (H, OH); and R is a member of the group consisting of H and acyl.

In the foregoing reaction, although I have observed a 100% transformation of the starting material, I have also noticed that where the starting material possesses a 21-ester group, saponification sometimes occurs. However, the free 21-ol is easily separated from its ester by solubility differences. Where an ester is desired, I have found it expedient to take steps to re-esterify any free 21-hydroxyl which may be present.

Although I have indicated that our preferred starting materials are 1,4-pregnadienes, my microbiological process is generally applicable to a wide variety of steroids. For example starting with cortisone, hydrocortisone, Reichstein's compound S, progesterone, etc., there is obtained respectively, 6β-hydroxy-cortisone, 6β-hydroxy-hydrocortisone, 1,4-pregnadiene-6β,17α,21-triol-3,20-dione, 6β-hydroxy-progesterone, etc. It is to be noted that these products are prepared also in essentially quantitative yield and are easily separated from the reaction mixture.

The compounds of the general formula are primarily useful in their transformation into physiologically active corticoids, exemplified by the 1,4,6-pregnatrienes. The therapeutic applicability of the trienes is set forth in the copending application of Gould and Herzog, Serial No. 513,901, filed June 7, 1955. For example, as shown in the following equation, a compound of the general formula such as 1,4-pregnadiene-6β,17α,21-triol-3,11,20-trione 21-acetate is treated with sulfonating agent such as p-toluenesulfonyl (Ts) chloride giving rise to the corresponding 6β-p-toluenesulfonate, VIII. Treating VIII with a high boiling base, such as diethyl-aniline for instance, ultimately affords the therapeutically active substance, IX, 1,4,6-pregnatriene-17α,21-diol-3,11,20-trione 21-acetate. As set forth in the aforementioned copending application of Herzog and Gould, compound IX, in addition to being therapeutically useful per se, is itself convertible to the known active analogous 1,4-pregnadiene; said conversion occurring by selective reduction of the 6,7 double bond.

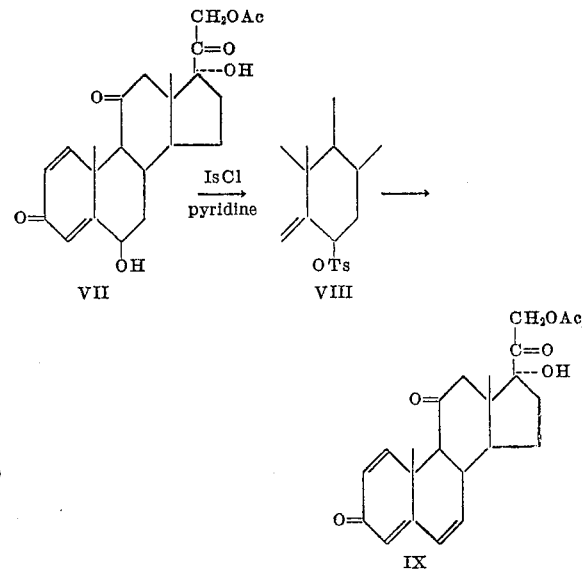

The compounds of the general formula which are devoid of an oxygen function at C-11 or C-21, are easily converted to the oxygenated analogs by introducing the oxygen function according to any of the methods described in the literature. For example, an oxygen function at C-11 may be introduced by a microorganism of the genus Curvularia or Rhizopus and the like, while the oxygen function at C-21 may be introduced microbilogically by means of a species of Ophiobolus herbotrichus or chemically through halogenation, acyloxylation and, if desired, saponification.

In addition to being useful intermediates in the preparation of therapeutically active corticoids, the compounds of my invention, especially those possessing an oxygen function at C-11 and C-21, are therapeutically useful per se. These compounds act as pituitary inhibitors, and are generally applicable in corticoid therapy in the treatment of certain inflammatory diseases. They may be administered orally, in the form of tablets, capsules and the like or parenterally in the solutions of suspension in non-toxic vehicles.

EXAMPLE 1

*1,4-pregnadiene-6β,17α,21-triol-3,11,20-trione*

Into each of ten 300 ml. Erlenmeyer flasks is placed 100 ml. of a growth medium having the following composition:

| | G. |
|---|---|
| Difco yeast extract | 3–10 |
| Corn steep liquor | 1 |
| Dextrose | 10 |
| Distilled or tap water, q.s. to one liter. | |

Each flask is inoculated with spores from an agar medium culture of *Chaetomium funicolum* (QM No. 33C) or with a 1–10% submerged inoculum which has been grown for 24–48 hours. The mixture is incubated by shaking the flasks on a rotary shaker for 24–48 hours at 28° C. at approximately 250 r.p.m. To each of the flasks (now showing prolific growth) is added, aseptically, 50 mg. of 1,4-pregnadiene-17α,21-diol-3,11,20-trione in 2 ml. of ethanol. The fermentation mixture is then incubated and shaken for 24–72 hours at 28° C. after which time complete conversion occurs. The mixture is extracted thoroughly with chloroform and the small fraction of the product which is retained within the mycelium is extracted by boiling the mycelium in chloroform for a few minutes. The chloroform extracts are combined and evaporated to a residue yielding approximately 50 mg. of crude material. The residue is triturated with methanol affording a crystalline solid which is purified by crystallization from acetone yielding 1,4-pregnadiene-6β,17α,21-diol-3,11,20-trione.

EXAMPLE 2

*1,4-pregnadiene-6β,11β,17α,21-tetrol-3,20-dione*

Essentially, the procedure of Example 1 is followed and 1,4-pregnadiene-11β,17α,21-triol-3,20-dione is used as substrate. A culture of *Chaetomium cochliodes* (QM–624) is grown as described in Example 1 in a medium having the following composition:

| | G. |
|---|---|
| Edamine | 20 |
| Corn steep liquor | 3 |
| Dextrose (or cerelose) | 10–50 |
| Water, q.s. to one liter. | |

After the completion of the fermentation, the mixture is then extracted with methylene chloride and the organic layer is evaporated to a residue. The residue is digested with a little methanol and crystallized from methylene chloride-hexane affording 1,4-pregnadiene-6β,11β,17α,21-tetrol-3,20-dione.

EXAMPLE 3

*1,4-pregnadiene-6β,17α,21-triol-3,20-dione*

Following the procedure of Example 1 and utilizing 1,4-pregnadiene-17α,21-diol-3,20-dione as substrate, there is obtained the compound of this example which is purified by crystallization from acetone.

EXAMPLE 4

*1,4-pregnadiene-6β,17α-diol-3,20-dione*

Substituting 1,4-pregnadiene-17α-diol-3,20-dione gram for gram in the procedure described in Example 1 affords 1,4-pregnadiene-6β,17α-diol-3,20-dione.

Alternatively, *Chaetomium succineum* (QM–1044) may be employed as the culture.

EXAMPLE 5

*1,4 - pregnadiene - 6β,17α,21 - triol - 3,11,20 - trione 21-acetate*

A solution of 25 mg. of the compound of Example 1 in 2 ml. of anhydrous pyridine is poured onto 6 mg. of acetic anhydride in an anhydrous atmosphere. The mixture is stirred for 30 minutes and then poured into dilute sulfuric acid and ice. The resultant precipitate is removed by filtration, dried and crystallized from methanol, yielding the 21-acetate of this example.

EXAMPLE 6

*1,4 - pregnadiene - 6β,17α,21 - triol - 3,11,20 - trione 6β, 21-diacetate*

By increasing the amount of acetic anhydride to 100 mg. in the process described in the preceding example, the diacetate of this example is obtained and is purified by crystallization from acetone-hexane.

EXAMPLE 7

*1,4 - pregnadiene - 6β,11β,17α,21 - tetrol - 3,20 - dione 21-acetate*

A solution of 50 mg. of the product from Example 2 in 3–4 ml. of anhydrous pyridine is treated with 11–12 mg. of acetic anhydride and worked up as in Example 5. The 21-acetate so obtained is purified by crystallization from acetone.

EXAMPLE 8

*1,4 - pregnadiene - 6β,11β,17α,21 - tetrol - 3,20 - dione 6β,21-diacetate*

By increasing the quantity of acetic anhydride to 100 mg. in the procedure described in the preceding example, the diacetate of this example is obtained and purified by crystallization from methylene chloride-hexane.

EXAMPLE 9

*1,4 - pregnadiene - 6β,17α,21 - triol - 3,11,20 - trione-6β-benzoate 21-acetate*

To a solution of 100 mg. of the product of Example 5 in 2 ml. of an hydrous pyridine is added 100 mg. of benzoyl chloride and the mixture is stirred for one hour. The solution is poured into aqueous sulfuric acid and ice and the resulting precipitate was removed by filtration, washed with water and dried. Crystallization from methanol affords 1,4-pregnadiene-6β,17α,21-triol-3,11,20-trione-6β-benzoate 21-acetate.

EXAMPLE 10

*1,4 - pregnadiene - 6β,11β,17α,21 - tetrol - 3,20 - dione 6-p-toluenesulfonate, 21-acetate*

A solution of 100 mg. of the product of Example 7 in 2 ml. of anhydrous pyridine is treated with 100 mg. of p-toluenesulfonyl chloride. The mixture is processed as in Example 9 and the product of this example is obtained by crystallization from acetone-hexane.

EXAMPLE 11

*1,4,6 - pregnatriene - 17α,21 - diol - 3,11,20 - trione 21-acetate*

In a nitrogen atmosphere, a solution of 200 mg. of the product of Example 9 in 5 ml. of diethyl-aniline is refluxed for 30 minutes and then poured into dilute sulfuric acid and ice. The precipitate is collected on a filter, washed with water, dried and then dissolved in methylene chloride. The solution of the substrate is chromatographed on activated magnesium silicate which is pretreated by washing with hexane. The column is eluted with ether-hexane mixtures and the triene of this example is obtained, principally in the 70% ether fraction. Crystallization from acetone-hexane affords 1,4,6-pregnatriene-17α,21-diol-3,11,20-trione 21-acetate, M.P. 216–218°.

In similar fashion, by boiling 200 mg. of the product of Example 10 with 2,4,6-collidine, there is obtained 1,4,6-pregnatriene-11β,17α,21-triol-3,20-dione 21 - acetate which is purified by crystallization from ether-hexane after elution with ether.

EXAMPLE 12

*1,4 - pregnadiene - 6β,17α,21 - triol - 3,11,20 - trione-21-propionate*

A solution of 50 mg. of the product of Example 1 and 3 ml. of anhydrous pyridine is reacted with 16 mg. of propionic anhydride. The mixture is allowed to stand for one hour and then poured into dilute hydrochloric acid in ice. The resulting precipitate is removed by filtration, dried and crystallized from aqueous acetone to yield 1,4 - pregnadiene - 6β,17α - 21 - triol-3,11,20-trione-21-propionate.

EXAMPLE 13

*1,4 - pregnadiene - 6β,11β,17α,21 - tetrol - 3,20 - dione - 6,21-dibutyrate*

A solution of 50 mg. of the compound of Example 2 in 3 ml. of pyridine is reacted with 50 mg. of butyric anhydride in 1 ml. of pyridine. The mixture is allowed to stand overnight, then poured into dilute sulfuric acid in ice. The resulting precipitate is removed by filtration, dried and crystallized from acetonehexane to yield 1,4-pregnadiene-6β,11β,17α,21-tetrol-3,20-dione-6,21 - dibutyrate.

EXAMPLE 14

*1,4 - pregnadiene - 6β,17α,21 - triol - 3,11,20 - trione-6-nictotinate-21-acetate*

A solution of 100 mg. of the compound of Example 5 and 50 mg. of nicotinic anhydride in 10 ml. of pyridine is allowed to stand overnight at room temperature. The careful addition of water yielded a precipitate which when filtered, dried and recrystallized from methanol gave 1,4-pregnadiene - 6β,17α,21 - triol - 3,11,20 - trione - 6 - nicotinate-21-acetate.

EXAMPLE 15

*1,4 - pregnadiene - 6β,11β,17α,21 - tetrol - 3,20 - dione - 6,21-dicyclohexane carboxylate*

A mixture of 100 mg. of the product of Example 2 and 100 mg. of the acid chloride of cyclohexane carboxylic acid and 5 ml. of pyridine was warmed on the steam bath for 10 minutes. The mixture was then poured into aqueous hydrochloric acid in ice, and the resultant precipitate removed by filtration, dried and crystallized from aqueous aceto nitrile to yield 1,4-pregnadiene-6β, 11β,17α,21 - tetrol - 3,20 - dione - 6,21 - dicyclohexane carboxylate.

EXAMPLE 16

*1,4 - pregnadiene - 6β,11β,17α,21 - tetrol - 3,20 - dione - 6-methane sulfonate-21-acetate*

A solution of 100 mg. of the compound of Example 7 and 30 mg. of methane sulfonyl chloride in 5 ml. of pyridine is allowed to react at room temperature for 6 hours. The mixture is poured into dilute sulfuric acid and ice and the resulting precipitate removed by filtration and dried. Crystallization from acetone and water gave 1,4 - pregnadiene - 6β,11β,17α,21 - tetrol - 3,20 - dione - 6 methane sulfonate-21-acetate.

EXAMPLE 17

*1,4-pregnadiene-6β,17α,21-triol-3,20-dione-6-phenoxy acetate-21-acetate*

A solution of 50 mg. of the product of Example 13 and 10 mg. of phenoxy acetyl chloride in 5 ml. of pyridine was allowed to react at room temperature overnight. The mixture is poured into dilute sulfuric acid and ice and the resulting precipitate removed by precipitation and dried. Crystallization from methanol yielded 1,4-pregnadiene-6β,17α,21-triol-3,20-dione-6-phenoxy acetate-21-acetate.

EXAMPLE 18

*1,4-pregnadiene-6β,11β,17α,21-tetrol-3,20-dione-6-benzene sulfonate-21-acetate*

A solution of 100 mg. of the compound of Example 7 and 30 mg. of benzene sulfonyl chloride in 5 ml. of pyridine is allowed to react at room temperature for 6 hours. The mixture is poured into dilute sulfuric acid and ice and the resulting precipitate removed by filtration and dried. Crystallization from acetone and water gave 1,4-pregnadiene-6β,11β,17α,21-tetrol-3,20-dione-6-benzene sulfonate-21-acetate.

I claim:

1. Compounds having the following formula:

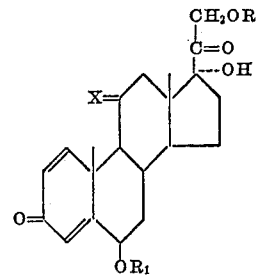

wherein X is a member of the group consisting of O and (H, OH), and each of R and $R_1$ is a member of the group consisting of H and an acyl radical derived from an organic acid containing up to 16 carbon atoms, $R_1$ being H when R is H.

2. 1,4-pregnadiene-6β,17α,21-triol-3,11,20-trione.

3. 1,4 - pregnadiene - 6β,11β,17α,21 - tetrol - 3,20-dione.

4. 1,4 - pregnadiene - 6β,17α,21 - triol - 3,11,20 - trione-21-acetate.

5. 1,4 - pregnadiene - 6β,17α,21 - triol - 3,11,20 - trione-6β,21-diacetate.

6. 1,4 - pregnadiene - 6β,11β,17α,21 - tetrol - 3,20-dione-21-acetate.

7. 1,4 - pregnadiene - 6β,11β,17α,21 - tetrol - 3,20-dione-6β, 21-diacetate.

8. 1,4 - pregnadiene - 6β,17α,21 - triol - 3,11,20 - trione-6β-benzoate-21-acetate.

9. 1,4 - pregnadiene - 6β,11β,17α,21 - tetrol - 3,20-dione-6-p-toluene-sulfonate-21-acetate.

10. 1,4 - pregnadiene - 6β,11β,17α,21 - tetrol - 3,20-dione-6-methane sulfonate-21-acetate.

11. 1,4 - pregnadiene - 6β,11β,17α,21 - tetrol - 3,20-dione-6-benzene sulfonate-21-acetate.

References Cited in the file of this patent

UNITED STATES PATENTS 2,816,902    Gould et al. _____ Dec. 17, 1957